United States Patent
Karstens

(10) Patent No.: US 7,499,974 B2
(45) Date of Patent: Mar. 3, 2009

(54) INSTANT MESSAGE USER MANAGEMENT

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 10/674,781

(22) Filed: Sep. 30, 2003

(65) Prior Publication Data

US 2005/0071435 A1 Mar. 31, 2005

(51) Int. Cl.
G06F 15/16 (2006.01)
G06F 3/00 (2006.01)

(52) U.S. Cl. ...................................... 709/206; 715/758
(58) Field of Classification Search ................ 709/206; 715/758

See application file for complete search history.

(56) References Cited

U.S. PATENT DOCUMENTS

| | | | |
|---|---|---|---|
| 7,096,255 B2* | 8/2006 | Malik | 709/206 |
| 7,124,370 B2* | 10/2006 | Fish | 715/741 |
| 7,139,806 B2* | 11/2006 | Hayes et al. | 709/207 |
| 7,188,140 B1* | 3/2007 | Greenspan et al. | 709/204 |
| 7,200,638 B2* | 4/2007 | Lake | 709/206 |
| 7,370,278 B2* | 5/2008 | Malik et al. | 715/758 |
| 7,401,098 B2* | 7/2008 | Baker | 707/104.1 |
| 2002/0122391 A1* | 9/2002 | Shalit | 370/260 |
| 2003/0065721 A1* | 4/2003 | Roskind | 709/204 |
| 2003/0065729 A1 | 4/2003 | Leinonen | |
| 2003/0110044 A1* | 6/2003 | Nix et al. | 705/1 |
| 2003/0154293 A1* | 8/2003 | Zmolek | 709/228 |
| 2003/0220976 A1* | 11/2003 | Malik | 709/206 |
| 2003/0220977 A1* | 11/2003 | Malik | 709/206 |
| 2004/0153506 A1* | 8/2004 | Ito et al. | 709/204 |
| 2004/0172455 A1* | 9/2004 | Green et al. | 709/207 |
| 2004/0249900 A1* | 12/2004 | Karstens | 709/207 |
| 2004/0254998 A1* | 12/2004 | Horvitz | 709/206 |
| 2005/0041793 A1* | 2/2005 | Fulton et al. | 379/211.01 |
| 2005/0044143 A1* | 2/2005 | Zimmermann et al. | 709/204 |
| 2006/0141982 A1* | 6/2006 | Timmins et al. | 455/405 |
| 2006/0227803 A1* | 10/2006 | Malik | 370/461 |
| 2007/0127702 A1* | 6/2007 | Shaffer et al. | 379/355.04 |
| 2008/0028032 A1* | 1/2008 | Hladik | 709/207 |
| 2008/0065758 A1* | 3/2008 | Narayanaswami | 709/224 |

OTHER PUBLICATIONS

"Instant Messenger FAQ Buddy Lists", http://site.aol.com/aim/faq2/buddylists.html, © 2000, AOL.*

* cited by examiner

*Primary Examiner*—Douglas B Blair
(74) *Attorney, Agent, or Firm*—Marcia L. Doubet

(57) ABSTRACT

Techniques are disclosed for improving management of user information in instant messaging systems. Expiration criteria are defined, whereby one or more users or user groups may be considered as having "expired" from consideration by instant messaging functions such as presence determination. In particular, instant messaging activity is preferably used as an expiration criterion. Absence of inbound or outbound messages for a specified amount of time (or since a particular date/time) can therefore be used as a trigger for treating a user or group of users as expired. As a result, efficiency of an instant messaging system is improved by omitting the expired users and groups from subsequent management operations. Optionally, an expired user or group may be revived upon occurrence of certain events (such as a newly-arriving instant message from, or a change in presence status of, the user or group). "On-demand" expiration and revival are preferably provided as well.

3 Claims, 7 Drawing Sheets

| ID | last-sent-msg | outbound auto-expire | last-recd-msg | inbound auto-expire | status |
|---|---|---|---|---|---|
| Ann | 01/01/03 | 6 months | 01/01/03 | 6 months | expired |
| Bob | 01/01/03 | 6 months | 02/02/03 | 6 months | expired |
| Carol | 08/01/03 | 3 weeks | 08/02/03 | 3 weeks | active |
| Don | 08/01/03 | 2 months | 08/06/03 | 2 months | active |
| Ellen | 06/01/03 | 2 months | 06/01/03 | 2 months | expired |
| Frank | 05/04/03 | 1 year | 04/05/03 | 1 year | active |
| Grace | 03/03/03 | 5 days | 03/03/03 | 5 days | expired |
| Friends | 08/01/03 | 1 month | 08/02/03 | 1 month | active |
| Garden Club | 06/01/03 | 2 months | 06/01/03 | 2 months | expired |

FIG. 5

Instant Message Auto-Expiration — 500

Select user or group — 510

Last inbound message received — 520
Inbound auto-expiration period — 521
User/group expires on expired — 522
524 Revive    Reset 525

Last outbound message sent — 530
Outbound auto-expiration period — 531
User/group expires on expired — 532
534 Revive    Reset 535

OK    Cancel

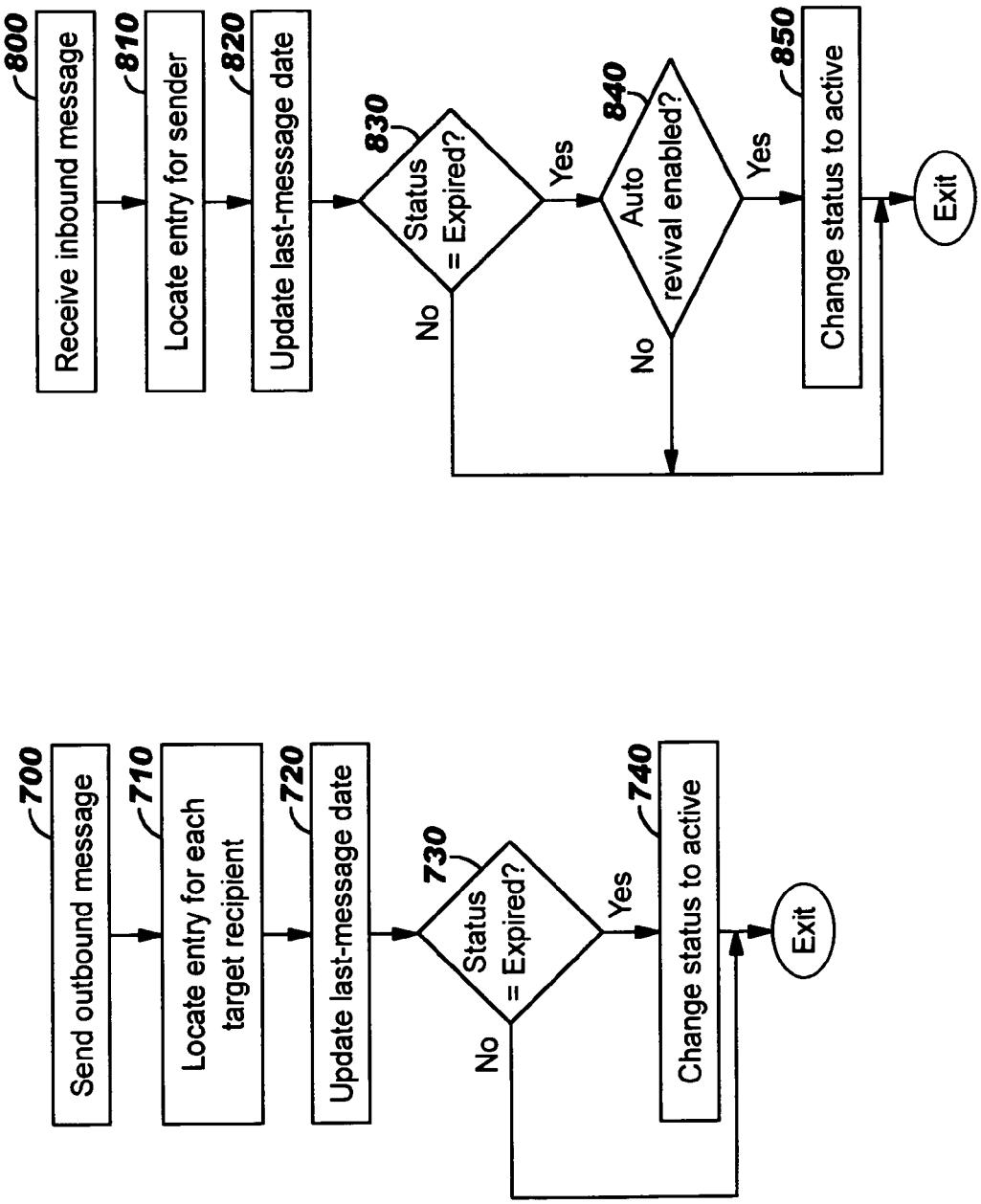

INSTANT MESSAGE USER MANAGEMENT

BACKGROUND OF THE INVENTION

1. Field of the Invention

The present invention relates to computer software, and deals more particularly with techniques for managing user information in instant messaging systems.

2. Description of the Related Art

Instant messaging systems are a popular communications mechanism for many people, and provide for instant, real-time communication between users who are connected to the system through an on-line or electronic networking environment such as the Internet, World Wide Web (hereinafter, "Web"), or corporate internal intranets. Examples of instant messaging systems include Yahoo!® Messenger, AOL Instant Messenger[SM], and Lotus Instant Messaging and Web Conferencing. ("Yahoo!" is a registered trademark of Yahoo! Inc. and "AOL Instant Messenger" is a service mark of America Online, Inc.)

Instant messaging systems provide real-time awareness of who is logged on. Typically, an instant messaging (hereinafter, "IM") system user has an address book or "buddy list" containing names or nicknames for those people with whom he communicates. The entries in this address book are used for selecting a message recipient. In addition, the IM system ("IMS") typically indicates, using a visual cue (such as different icons or different fonts), which of the people in the address book are logged on to the system and which are not. When the message sender and the target recipient are both currently logged on to an IMS (which may be the same IMS, or a different IMS), a message can be delivered and presented to the recipient nearly instantly (depending on network delay).

Instant messaging systems are often used for communicating among friends, and are also becoming integral business tools that enable team members or other business associates to communicate more efficiently and effectively (e.g., as they collaborate on a project).

An IMS user may also have user groups defined in his address book, where a user group comprises individual users (each of whom may also have a separate entry in the address book) and, optionally, other groups. Over time, as a user adds more and more people (or groups) to his address book, a situation arises where a number of these people/groups will not actually engage in IM sessions with the user in the near term (where "near term" may be defined in various ways, including this week, this month, this year, etc.). For example, a user "Joe" may have 300 entries in his IM address book, whereas he only engages in IM sessions on a weekly basis with 5 of these people.

In current IM systems, an IM server manages functions, such as "presence" detection, of the address book equivalently for all users. "Presence", for an IMS, is the function whereby the IM display for a user such as Joe is dynamically updated to indicate which users from Joe's address book are currently online (and are therefore available for participating in an IM session). As can be imagined, as Joe's address book grows larger over time, the amount of system resources expended in performing management functions such as presence increases. The presence function, for example, is typically notified when a user's IM client comes online, and this presence function then notifies other IM users of the new client presence. When a user's IM client becomes inactive, enters a "do not disturb" state, or goes offline, it sends a message to the presence server, which in turn communicates that information to other IM users. In a situation such as the example described above, where Joe only interacts with 5 users but has 300 entries in his address book, a very unproductive use of resources results due to current IM servers managing functions (such as presence) of all these users. The overall efficiency of the IM server is seriously degraded when there are a number of users in this same situation.

One solution to this problem would be for Joe to simply delete users or groups from his address book, as he finds he does not interact with them frequently. However, if he subsequently wishes to engage in an IM session with a deleted user or group, he will need to manually re-enter their information into his address book. Re-entering information is time-consuming, and therefore most users do not find this approach acceptable.

Accordingly, what is needed are improvements to the management of user information in IM systems.

SUMMARY OF THE INVENTION

An object of the present invention is to provide techniques for improving the management of user information in IM systems.

Another object of the present invention is to provide techniques whereby user entries in an IM address book can be treated as "expired", without actually deleting those entries.

A further object of the present invention is to provide techniques for managing expired IM address book entries differently from non-expired entries to thereby improve efficiency of an IMS.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, and/or computer program products. In one aspect, the present invention comprises techniques for managing user information in an IMS by: determining, for an IM client, whether users remembered by the IM client should be treated as expired; and omitting those users which are to be treated as expired when performing selected IM management functions.

The omitting preferably includes omitting the expired users when performing presence determination. The determination preferably further comprises using expiration criteria selected by a user of the IM client. This determination may comprise one or more of: comparing a first date when an instant message last arrived from a particular user to a second date selected by a user of the IM client; determining whether an instant message last arrived from a particular user more than a specified length of time before the current time; comparing a first date when an instant message was last sent by a user of the IM client to a particular user to a second date selected by the IM client user; and determining whether an instant message was last sent by a user of the IM client user to a particular user more than a specified length of time before the current time.

The determination may be triggered in several ways, including by scheduling an action to analyze expiration information for each presently-unexpired user; performing the evaluation of each presently-unexpired user at configured intervals; and/or by scheduling an expiration action for each of one or more users, where each user will then be treated as expired upon execution of the scheduled expiration action for that user.

Optionally, the determination may further comprise selecting, by a user of the IM client, one or more users that will then be automatically treated as currently expired.

The determination and the omitting may also be performed for user groups remembered by the IM client.

The determination may use default expiration criteria, and a user of the IM client may be allowed to selectively override the default expiration criteria.

This aspect may further comprise receiving an inbound message from a particular user who is being treated as expired, and then treating the particular user as no longer expired, responsive to the receiving. In addition or instead, this aspect may further comprise sending an outbound message from the IM client to a particular user who is being treated as expired, and then treating the particular user as no longer expired, responsive to the sending.

A distinct visual indicator is preferably used for those users who are being treated as expired when presenting those users' names on a display to a user of the IM client. The users remembered by the IM client are preferably those users having entries in an address book used by the IM client.

In another aspect, the present invention provides techniques for managing user information in an IMS, comprising: determining, for an IM client, whether users remembered by the IM client should be treated as expired; and providing a different visual representation for the remembered users who are to be treated as expired, as contrasted to the remembered users who are not to be treated as expired, when displaying an IM client display to a user of the IM client.

The different visual representation may, for example, comprise using an italicized font when displaying names or nicknames of the remembered users who are to be treated as expired, as contrasted to a non-italicized font used when displaying names or nicknames of the remembered users who are not to be treated as expired. In addition or instead, the different visual representation may comprise omitting the names or nicknames of the remembered users who are to be treated as expired when displaying the IM client display to the IM client user.

The present invention may also be used advantageously in methods of doing business, for example by providing improved management of users in an IMS. This may comprise: evaluating, for an IM client, which of the users remembered by the IM client should be treated as expired; providing, for the IM client, an indication for those users which are to be treated as expired; and charging a fee for carrying out the evaluation and providing the indication. The fee for this improved management may be collected under various revenue models, such as pay-per-use billing, monthly or other periodic billing, and so forth.

The present invention will now be described with reference to the following drawings, in which like reference numbers denote the same element throughout.

BRIEF DESCRIPTION OF THE DRAWINGS

FIG. 4 illustrates a sample data structure that may be used to record expiration information for users and user groups in an IMS, according to preferred embodiments of the present invention;

FIG. 5 provides a sample GUI display illustrating how an IM user may selectively display and modify expiration information, according to preferred embodiments of the present invention; and FIGS. 6-8 provide flowcharts illustrating logic that may be used when implementing preferred embodiments of the present invention.

DESCRIPTION OF PREFERRED EMBODIMENTS

The present invention provides techniques for improving the management of user information in IM systems. One or more users or user groups may "expire" from a particular IM client user's perspective. When a user or user group has expired, the IMS no longer includes that user or group in the management functions it performs for that particular IM client user. As a result, unproductive overhead is reduced and the overall efficiency of the IMS may be significantly improved.

Figure 1:
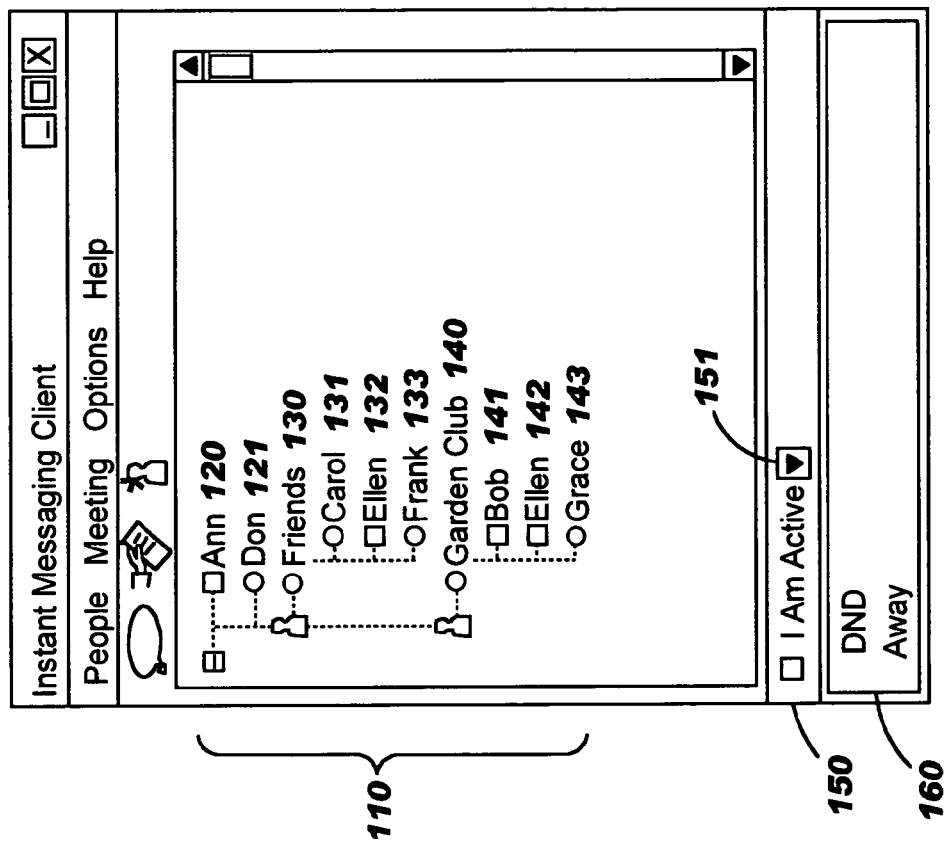
FIG. 1 provides a sample graphical user interface ("GUI") display of an IM system, indicating current presence information for users and groups defined in an IM address book, according to the prior art.

The sample GUI display 100 in FIG. 1 represents an IM client display of the prior art, where the address book for the user of this IM client has entries for a number of users and user groups and the display 100 indicates the current online presence of these users and user groups (shown generally at 110). In particular, users Ann and Don are defined individually (that is, without being defined as group members), and groups named "Friends" and "Garden Club" are defined. See elements 120, 121, 130, and 140, respectively. As shown in FIG. 1, different graphical symbols (and, typically, different colors) are used to indicate the IM status of each user. In this example display 100, squares to the left of user nicknames represent those users who are currently online and circles to the left of user nicknames represent users who are not currently online. In this example, the current IM status for the person using this IM client is also shown (see element 150), and is shown as "active", and a drop-down list is provided (see element 151) whereby the user can select an alternate IM status. Alternate choices for IM status are shown at element 160, and include choices of "DND" (for "do not disturb") and "Away".

According to preferred embodiments, users and groups expire automatically when expiration criteria are met. This automatic expiration is also referred to herein as the "auto-expire" or "auto-expiration" of users or groups. In addition, a user may explicitly force selected users or user groups into an expired status. This is also referred to herein as "on-demand expiration". The manner in which these operations are performed in preferred embodiments will now be described in more detail.

Preferably, a set of default auto-expiration information is defined at the level of an individual IM client user, and the IM client user is allowed to override these default values for selected users and/or groups in the IM client user's address book. Or, if default values are not provided, the IM client user is allowed to configure his IM client with a set of default values. (A data structure that may be used to record information used for expiration of users and groups is described below, with reference to FIG. 4.) For ease of reference, the term "configuring" the auto-expiration values is used herein to refer to the process whereby an IM user either configures, or overrides, the defaults that apply to all users and groups.

According to preferred embodiments, the expiration of users and groups from one IM user's perspective preferably has no effect on the status of those users or groups in the IM client of another user. For example, if a user "Bob" meets the auto-expiration criteria for Joe's IM client, this has no impact on how Bob is represented in any other IM user's client.

Figure 2:
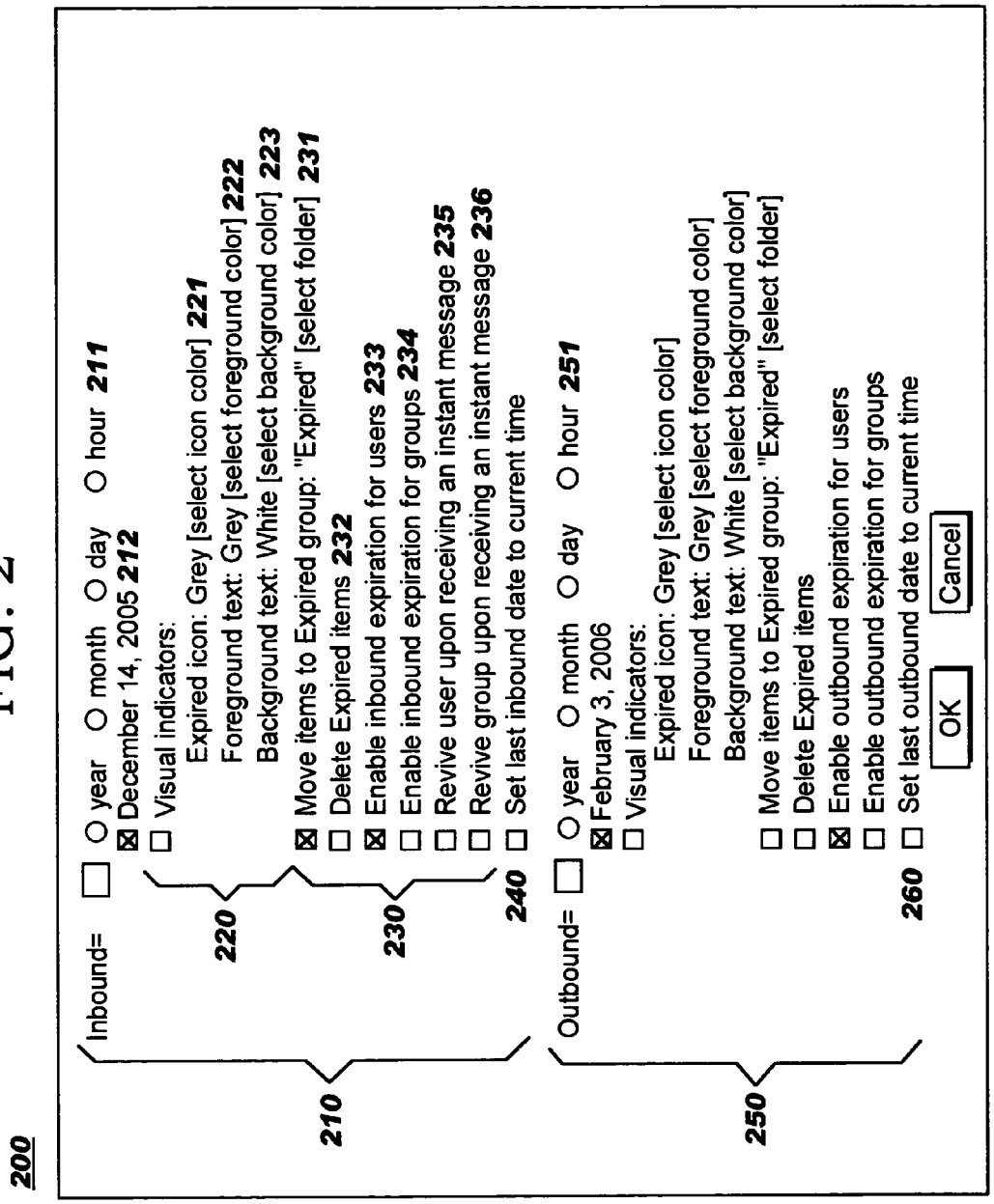
FIG. 2 illustrates a sample GUI display that may be used to specify default auto-expiration information, according to preferred embodiments.

FIG. 2 illustrates a sample GUI display 200 with which an IM user may configure the default values for auto-expiration information. As shown therein, different values may be used for inbound auto-expiration and for outbound auto-expiration. See, generally, elements 210 and 250.

An auto-expiration value may be specified as a relative value or an absolute value. An inbound auto-expiration value may be specified as a relative value by selecting a particular period of time, as shown at 211. Suppose, for example, that Joe selects an inbound auto-expiration value of 3 months. This selection indicates that a user should be automatically expired from Joe's address book if no inbound IM message is received from that user within the most recent 3 months. This provides a "sliding expiration date" approach, whereby auto-expiration decisions are made by looking backwards from the current date to see if there has been any IM activity with the user during the applicable time period. For example, if Joe's auto-expiration value for inbound messages is 3 months, and a message last arrived from Jane on Jul. 30, 2003, then Jane will be automatically expired unless she sends a new message before Oct. 30, 2003. Suppose Jane does send a new message on Oct. 1, 2003. In this case, her auto-expiration date will be automatically changed to Jan. 1, 2004.

As an alternative to the sliding-date approach, an implementation may use the entries at element 211 of FIG. 2 (and, similarly, the outbound information entered at element 251) to statically compute an auto-expiration date as a fixed offset from the current date. In this alternative approach, a one-time check of IM activity is performed on the potential auto-expiration date for a potentially-expiring user. For example, if Joe enters an auto-expiration value of 3 months at element 211, this alternative implementation adds 3 months to the current date and stores the result as the date on which a user's activity will be evaluated. In contrast to the sliding-date approach, receiving a new message from a user does not reset the auto-expiration date in this alternative approach. To illustrate this alternative approach in more detail, suppose Joe selects a 3-month expiration interval on Aug. 1, 2003. The auto-expiration date will then be set to Nov. 1, 2003. On that date, Jane's IM activity will be evaluated. Suppose a message last arrived from Jane on Jul. 30, 2003. Jane will be automatically expired during the November 1st evaluation, since her most-recent message is more than 3 months old. However, if Jane's message had arrived on Aug. 2, 2003 instead, then the November 1st evaluation would leave Jane as an unexpired user. No further auto-expiration evaluations would be performed for Jane (in terms of inbound messages), unless Joe took an action to enter new auto-expiration information.

When an inbound auto-expiration value specified in terms of a time period is applied to a user group, the user group is automatically expired when an inbound IM message has not been received from any of the group members in the specified time period.

While FIG. 2 illustrates use of radio buttons to select a unit of time and a dialog box for entering the number of time units at element 211, it will be obvious that this information may be provided in other ways. For example, a drop-down list of time units could be provided, from which the IM user can then make a selection. The IM user may also be allowed to define a time period using more than one time unit, although this has not been shown. For example, Joe might define a time period as 2 months, 3 weeks, and 5 days. Furthermore, it is not strictly necessary that a GUI display is provided for this configuration process. For example, the auto-expiration information stored in a file may be edited with a simple text editor to provide user-configurable expiration settings, without deviating from the scope of the present invention.

As an alternative to using a relative period of time as has been described with reference to element 211, an inbound auto-expiration value may be specified as an absolute value, for example by selecting a particular calendar date. This is illustrated in FIG. 2 at element 212. Entry fields may be provided for entering the month, day, and year, or a calendar icon may be provided with which the user can display a calendar for the purpose of selecting an auto-expiration date. In preferred embodiments, when a calendar date is used for the inbound auto-expiration value, users and groups will be automatically expired if no inbound IM message arrives from those users or groups after the selected date.

Use of absolute expiration dates may, in some cases, result in new users being instantly expired. For example, if Joe sets an auto-expiration date of Feb. 1, 2003, then any new entries he creates in his address book after that time will be instantly expired (since the expiration date has passed).

Preferably, when a user or group is expired, in addition to omitting that user or group when performing management functions (as discussed above), a visual representation of that user or group on the IM client display is distinct from the visual representations of unexpired users and groups. The IM client display thereby provides a quick and easy-to-use presentation of expiration information (in addition to the presence information provided by prior art IM systems).

Figure 3:
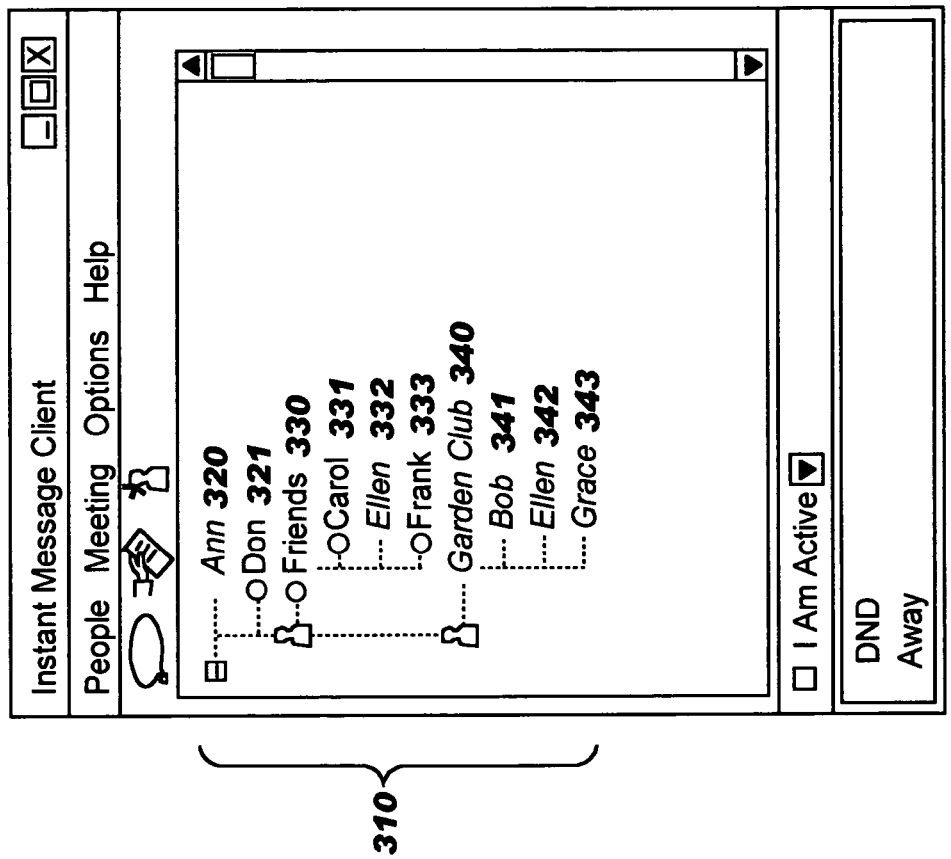
FIG. 3 illustrates the GUI display of FIG. 1 as augmented, according to preferred embodiments of the present invention, to indicate expiration of users and user groups.

Preferred embodiments are described herein with reference to using italicization to visually indicate those users and groups that have expired (although this is by way of illustration, and not of limitation). In preferred embodiments, the expired users and groups are presented on the IM client display in the same relative locations where they appear when using a prior art IM client display, but the user name or group name of each expired user and group is presented in an italicized font. This is illustrated in FIG. 3, where italics indicate visually that Ann 320 is expired; Ellen 332 from the Friends group 330 is expired; and the entire Garden Club group 340 and its members Bob 341, Ellen 342, and Grace 343 are also expired. (The user or group "name" may actually be a nickname for the user or group.)

Note that, in this example display 300, the typical icons that indicate presence have also been removed for these expired users and group, since the expired status indicates that the IMS should no longer check their presence. Alternatively, a specific icon that is designed to indicate the expired status may be displayed. Particular colors may also be used to indicate those users and group which are expired. Referring again to FIG. 2, element 220 shows generally that the IM user may optionally be allowed to select additional (or different) visual indicators of expiration. As shown therein at 221, the user may be allowed to specify a particular color to be used for the icon associated with expired users and groups. In addition, the user may be allowed to select a foreground text color and background text color to be used when displaying the names of expired users and user groups, as shown at elements 222 and 223, respectively.

A number of optional functions may also be supported by an implementation of the present invention, and the IM user may be allowed to configure these functions. Representative functions are shown generally at elements 230 and 240, and will now be described.

Optionally, expired users and groups may be automatically moved to a selected folder, as shown by the configurable option at element 231. In this case, the IM user can display the folder contents for an at-a-glance view of which users and groups are expired. Those expired users and groups are then preferably removed from the IMS display of unexpired users, which allows the IM client user to see a less-cluttered view.

In the general case, expired users and groups are not actually deleted from the IM user's address book. This approach is useful in case the user or group subsequently becomes active again, in which case the IM user does not need to re-enter information into his address book. An option may be provided, however, that allows a particular IM user to specify that expired users and groups should be deleted. This option is shown at element 232 of FIG. 2 (for the inbound case).

Users may also be allowed to selectively enable the expiration function. Elements 233 and 234 are provided in the example configuration display 200 for this purpose (for the inbound case), whereby the IM user can separately enable the expiration function as applied to users and to groups.

If an inbound IM message arrives from an expired user or group, an implementation of the present invention may optionally be adapted for automatically "reviving" that user or group. Or, the IM user may be allowed to selectively enable this revival function. In the latter case, the user may be allowed to enable the revival function separately for individual users and for groups, as shown at elements 235 and 236 (for the inbound case). When a user is revived, the auto-expiration value for that user is preferably automatically set to the default value (e.g., a default time period as specified at element 211 or a fixed date as specified at element 212). Similarly, when a user group is revived, the auto-expiration value for each user is preferably automatically set to the default value.

An option may also be provided whereby the IM user can set the "last inbound date" to the current time, as shown at element 240 (for the inbound case). For example, if IM user Joe last received an inbound message from Sally on Apr. 1, 2003 but selects this option as of Oct. 1, 2003, then Sally's information will record that a message from Sally was received on Oct. 1, 2003.

As another example of using the box shown at element 240, suppose Joe has configured an auto-expiration interval of 4 months, and that a message was last received from Sam on Jan. 1, 2003. The auto-expiration date for Sam is therefore May 1, 2003. Now suppose that on Feb. 1, 2003, Joe decides to change Sam's auto-expiration interval to 2 months instead of 4. Since the last message received from Sam was January 1st, Sam's auto-expiration date will then be Mar. 1, 2003. However, Joe may elect to check the "Set last inbound date to current time" box 240. In that case, Sam's information will be changed to reflect arrival of a message on February 1st, and his new auto-expiration date will then be Apr. 1, 2003.

If a user changes auto-expiration values, this may cause instant expirations in some cases. For example, with reference to the scenario just described, if Joe changes Sam's auto-expiration interval to 2 months on Mar. 15, 2003 (but does not use box 240 to change last-arrival information), then Sam will be instantly expired.

Note that an implementation of the present invention may use the time, as well as the date, when determining expiration. Therefore, omission of time-of-day considerations in the examples discussed herein is not by way of limitation.

Outbound auto-expiration information may be specified in a similar manner to specification of inbound information. Thus, element 250 of FIG. 2 generally provides analogous information to element 210, and element 260 provides analogous information to element 240. As an example of using an outbound auto-expiration time period, suppose that Joe selects an outbound auto-expiration value of 2 weeks. This selection indicates that a user should be automatically expired from Joe's address book if Joe has not sent an IM message to that user in the past 2 weeks. Similarly, a user group should be automatically expired if Joe has not sent an IM message to any member of that group in the past 2 weeks. Or, when an outbound auto-expiration value is specified in terms of a fixed date, the user or user group is automatically expired if no outbound IM message has been sent to that user or to any member of the user group since before the specified date.

Note that options have not been provided in FIG. 2 for reviving users and user groups when a new outbound message is sent to an already-expired user or user group. If desired, this function may be provided for outbound auto-expiration in a similar manner to that described above for revival due to inbound messages.

Turning now to FIG. 4, a sample data structure is depicted that may be used to record expiration information for users and user groups in an IMS, according to preferred embodiments. This data structure is referred to herein by way of illustration, but not of limitation, as a table. As shown in FIG. 4, table 400 includes columns that record the user or user group identifier 410 (and/or the nickname), the date 420 when an IM message was last sent to this user or group (i.e., the last outbound message date), the outbound auto-expiration value 430 to be applied to this user or group, the date 420 when an IM message was last received from this user or group (i.e., the last inbound message date), the inbound auto-expiration value 450 to be applied to this user or group, and the expiration status 460 of this user or group. While this information is described herein with reference to a data structure used solely for expiration information, it is to be understood that an actual implementation of the present invention may provide expiration invention by augmenting entries in an already-existing address book or similar data structure. Furthermore, a number of different formats may be used with the expiration information, without deviating from the inventive concepts of the present invention. For example, columns 420 and/or 440 may represent their values using time of day in addition to, or instead or, a calendar date (and any suitable format for representing date and time information may be used).

The row 470 for user Ann, for example, indicates that Joe last sent an IM message to Ann on Jan. 1, 2003 (column 420), and also last received a message from Ann on that same date (column 440). An auto-expiration time for outbound messages (column 430) is set to 6 months for this user, and this same auto-expiration time is used for inbound messages (column 450). Assuming that the current date is more than 6 months later than Jan. 1, 2003, the expiration status (column 460) for Ann is set to "expired". The row 472 for user Carol, on the other hand, indicates that Carol's expiration status is "active" (column 460). This row further indicates that Joe last sent an IM message to Carol on Aug. 1, 2003 (column 420), and last received a message from Carol on Aug. 2, 2003 (column 440). Carol's auto-expiration time for outbound messages (column 430) is set to 3 weeks, as is her auto-expiration time for inbound messages (column 450). Assuming that the current date is less than 3 weeks after the dates of Aug. 1, 2003 and Aug. 2, 2003, Carol is an active user.

When different values are specified for the outbound auto-expiration and the inbound auto-expiration, an implementation of the present invention preferably uses the first-occurring one of these two dates when determining whether a particular user or user group has expired. Alternatively, a single value that applies to both inbound and outbound auto-expiration may be used without deviating from the scope of the present invention. In this latter case, columns 430 and 450 are replaced by a single auto-expiration column, and that single value is used to determine whether a user or group has expired. Or, a user may configure his implementation so that either an inbound date or an outbound date, but not both, is evaluated. (See the discussion of elements 233 and 234 of FIG. 2, above.)

If the IM user changes the inbound and/or outbound auto-expiration values once entries such as those depicted in table 400 are already created, for example by entering a new time period at element 211 of FIG. 2 or a new fixed date at element 212, then all table entries may be updated automatically and immediately. Or, an implementation of the present invention may be adapted for automatically applying the new default values only to newly-created table entries. As another approach, discussed below with reference to the "Reset" function, the IM client user may selectively apply new default values to individual users and groups. In any case, when new auto-expiration values are to be applied to entries in table 400, the corresponding column 430 or 450 is preferably overridden with the new value.

Figure 6:
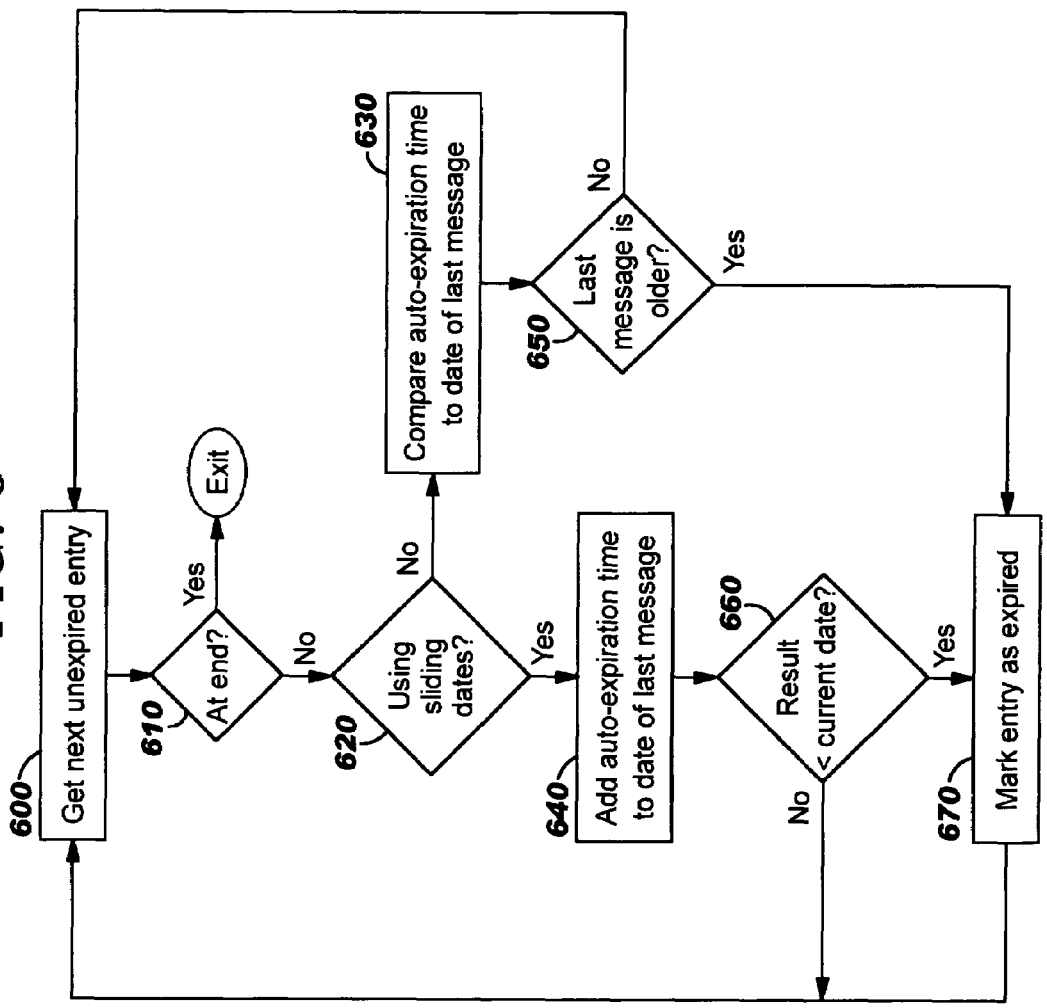

The auto-expiration values may be checked, for each unexpired user and group, by scheduling an evaluation action or event with a task scheduler, such that the evaluation will occur on a certain date. When the scheduled evaluation event is performed, any entries meeting their auto-expiration criteria will then be marked as expired. As another alternative, instead of scheduling an auto-expiration evaluation event, the checking of auto-expiration values may be performed periodically, e.g., at some configurable interval (such as monthly) or upon occurrence of some event (where the user may be allowed to specify the triggering event or events). (Another alternative that uses a task scheduler for scheduling auto-expiration events for IM users directly, rather than scheduling evaluation events, is described below prior to the discussion of FIG. 5.) The checking that is performed when messages are sent and received is described below, prior to the discussion of FIG. 5, and is not limited to unexpired users and groups. FIG. 6, described below, provides logic that may be used to implement the auto-expiration evaluation (i.e, checking for expiration), and FIGS. 7 and 8 provide logic that may be used to implement expiration processing for outbound and inbound messages, respectively. The manner in which the checking process is carried out depends on whether a "sliding date" approach as described above with reference to a relative time period or a fixed date (including an absolute date specified in the manner described with reference to element 212 of FIG. 2 or a relative date implemented using the "alternative approach" described above with reference to element 211 of FIG. 2, where an auto-expiration date is statically computed as a fixed offset from the current date) is specified for the auto-expiration values. When a sliding date approach is used, the checking performed for each unexpired user preferably comprises first adding the outbound auto-expiration value (column 430) to the date an outbound IM message was last sent (column 420) to this user, and comparing the result to the current date. Next, a comparison is made by adding the inbound auto-expiration value (column 450) to the date an inbound IM message was last received (column 440) from this user and comparing the result to the current date. Similarly, when a fixed date is used, the outbound auto-expiration value (column 430) is compared to the date an outbound IM message was last sent to this user (column 420) and the inbound auto-expiration date (column 450) is compared to the date an inbound IM message was last received from this user (column 440).

User groups may have rows in table 400, as shown at 476 and 478. The group row preferably comprises the dates messages were last received from, and sent to, any member of this group, along with the group-level auto-expiration values. A group expiration status is also stored. As an alternative to including a row in table 400 for each group, the table may be limited to rows for individual users, in which case a separate data structure may be used to record the group names and to remember which users are members of each group. In this case, if the separate group-level data structure is not adapted for recording the last-sent and last-received information for the group, that information is preferably re-computed each time the auto-expiration checking is carried out by evaluating each unexpired user who is a group member.

When rows for groups are present in table 400, a pointer, linked list, or similar reference (not shown in FIG. 4) may be provided in the group row for identifying the group members (and/or for pointing to each member's row in the table). In this manner, duplicated rows are avoided when a user is a member of multiple groups. For example, user Ellen is shown at elements 332 and 342 of FIG. 3 as being a member of the "Friends" group and the "Garden Club" group. Providing a reference from each group to Ellen's individual row 474 allows both groups to share this single set of information. Alternatively, the group member information may be repeated in each applicable group (e.g., by using a nested structure wherein rows for each group member are placed within a collection of rows which are associated with the group), without deviating from the scope of the present invention.

When an outbound message is sent to a target user, an embodiment of the present invention preferably locates that user's row in table 400 and revises the date-last-sent value in column 420. If this target user (i.e., recipient) is a member of one or more groups, then the value of column 420 in the row for each group is updated as well. When Joe sends a message to a group, the date-last-sent value in column 420 of that group's row is updated, and the row for each group member is preferably updated as well. Similarly, when Joe receives an inbound message from any user, the date-last-received value in column 440 is revised, and the row for any group in which this user is a member is also preferably revised. (FIGS. 7 and 8, described below, provide logic that may be used when implementing these operations.) After revising a user or group's row, if the expiration status for that row is set to expired, it is preferably changed to active. (If the IM user has not selected to use the automatic revival functions as described with reference to elements 235 and 236 of FIG. 2, however, the status updating in response to an inbound message is preferably bypassed.)

In another approach, a task scheduler is used for scheduling auto-expiration events. That is, rather than scheduling an evaluation event to analyze stored dates as described above, these scheduled auto-expiration events result in automatically expiring an IM user when the event is triggered or "fires". These auto-expiration events may be scheduled in several different ways, including upon addition of a new IM user (e.g., in a buddy list or address book), manual action by the end user, and occurrence of IM actions such as receiving an inbound instant message or sending an outbound instant message.

Suppose, for example, that a new IM user "Paul" is defined for Joe's IM system, in which default auto-expiration is currently set to 2 months. If the user definition occurs on June 1 st, then an auto-expiration event will be automatically scheduled with the task scheduler for August 1 st. If the event fires on that date, then Paul is set to expired status. Next, suppose that on July 1 st, Joe decides to change Paul's auto-expiration interval to 10 days instead of 2 months. An embodiment of the present invention using this approach then programmatically searches through the task scheduler's scheduled events until locating the auto-expiration event associated with Paul. Upon finding this scheduled event, the date is changed (or this existing event is deleted and a new event is created), such that the auto-expiration event for Paul will now fire on July 11 th.

Using this approach for the general case, before a scheduled event date is changed, the new date is preferably compared to the stored date (if found), and the scheduled event date is then set to the new date only if the new date is earlier than the stored date (or there is no stored date). Scheduled event dates set to past dates will immediately trigger the event.

As another example, updating the scheduled auto-expiration event in this manner may be triggered by receipt of a new instant message from Paul. If Joe has configured his IM client to automatically expire other IM users if no messages are received within 3 months, for example, then each time an inbound instant message arrives from a particular user, the task scheduler's events are preferably scanned to locate any already-scheduled auto-expiration event for that user. Upon locating an event, it is updated or replaced, as just discussed, such that the event will now fire in 3 months time.

As yet another example, Joe might use a GUI display such as display 200 in FIG. 2 to reset the last message received/sent date for selected users. If the last inbound instant message from Paul was July 1st and users are to expire if there is no inbound activity for 3 months, an auto-expiration event will be scheduled for October 1 st. Suppose that on September 15th, Joe decides he does not want Paul to be an expired user on the scheduled date. Joe might elect to check the "Set last inbound date to current time" box 240 in display 200. In that case, the task scheduler's scheduled events will be scanned to locate the event associated with Paul, and that event will be revised/replaced such that the auto-expiration event is now scheduled to fire on December 15th.

A task scheduler's auto-expiration events may be scheduled and/or altered responsive to other types of actions or other triggering events, and thus these examples are presented by way of illustration but not of limitation.

Turning now to FIG. 5, a sample GUI display 500 is provided that illustrates an optional aspect of preferred embodiments, whereby an IM user may modify auto-expiration information for selected users and/or user groups. As shown therein, the IM user first selects the user or group of interest, for example by selecting the user or group name from a drop-down list 510 that provides all of the names in the IM user's address book. After having made this selection, an implementation of the present invention preferably displays the date an IM message was last received from this user/group and the date an IM message was last sent to this user/group (at elements 520 and 530, respectively). The current auto-expiration values for this user or group are also preferably displayed at elements 521 and 531.

If this user/group is not currently expired, then the projected date when the user or group will expire is preferably shown in FIG. 5. In the example, separate projected expiration date areas are shown at 522 and 532. As noted above with reference to columns 430 and 450 of FIG. 5, when different auto-expiration dates are specified for outbound and inbound messages, then the user is preferably auto-expired using the first-occurring one of these dates. For example, suppose the auto-expiration date for inbound messages from Mary is Feb. 1, 2003 and the auto-expiration date for outbound messages to Mary is Feb. 5, 2003. If no messages are exchanged with Mary, then an implementation of the present invention preferably auto-expires Mary on February 1st. A single projected expiration date can be presented on display 500 to reflect this information (although this has not been shown in the example display 500). Alternatively, the February 1st auto-expiration for Mary can be disabled by selecting her entry as described above and then toggling the "Enable inbound expiration for users" setting to OFF. This setting was described above with reference to element 233 of FIG. 2 for global defaults. A similar user-specific setting is preferably provided on a display such as that shown in FIG. 5, although it has not been illustrated in this example display 500.

On the other hand, if the user/group has already expired, then the date of expiration may be shown at element 522 and/or 532.

The IM user is preferably allowed to change the auto-expiration value for either or both of the inbound and outbound cases. While display 500 shows a simple dialog box at elements 521 and 531 as being used for this purpose, this choice of entry mechanism is for drafting convenience. An actual implementation preferably provides options such as those shown at 211 and 212 of FIG. 2 (whereby the user can specify a numeric value for a relative expiration and then select a radio button to indicate the time units, or can activate a calendar icon to pick an absolute date). After having specified a new auto-expiration value, the IM user preferably presses a "Reset" button 525, 535, which causes the new value to be applied to this user or group's row in table 400. Note that the value of the expiration status in column 460 is preferably recomputed at this time as well. The use of "Revive" buttons 524, 534 will be described below.

The auto-expiration of users and groups has been discussed heretofore with reference to receiving and sending IM messages. In an optional aspect, additional types of events may be used when determining the date to be used in the auto-expiration computations. For example, Joe may specify that he is to be notified if user Ann becomes active (e.g., if Ann's presence is detected by the presence function), and this notification may be used when determining auto-expiration status. One or more additional columns may be added to table 400 to track the dates of such events. As an alternative, the value in either column 420 or column 440 may be updated upon occurrence of such events. For example, the date-last-received value in column 440 of row 470 in Joe's table 400 might be updated upon either (i) receiving an inbound message from Ann or (ii) receiving notification that Ann is currently active for instant messaging. Accordingly, this updated value may then be used in subsequent auto-expiration comparisons to determine Ann's expiration status.

An on-demand expiration function may also be provided, as noted earlier, whereby an IM user can selectively change the expiration status of users and/or groups. With reference to display 300 of FIG. 3, for example, Joe may wish to treat Carol (see element 331) as an expired user. Joe may invoke the on-demand expiration function, for example, by right-clicking his computer mouse when it is positioned over Carol's name. This selects Carol's name, and a pop-up menu or similar facility is then preferably activated, providing a choice such as "Expire Now". (The pop-up menu function may be triggered in other ways, if desired, such as by providing selections on a pull-down menu, providing one or more button graphics on the GUI, defining one or more function keys, and so forth. The term "pop-up menu" is used merely as one example.) The "Expire Now" choice may be accompanied by other choices such as "Configure Expiration Settings"; "Reset Expiration Settings"; "Chat"; "Remove"; "Edit Nickname"; "Alert Me When"; and so forth. These choices will now be described in more detail.

When the user selects "Expire Now" from the pop-up menu after having selected a user or group name, the auto-expiration logic is triggered, and the relative and/or absolute dates existing in the table 400 are ignored for the selected user or group. The user may have selected more than one user and/or group, for example by using some type of multi-select capability, in which case the dates for all of the selected entries from table 400 are ignored. Instead of using the dates from table 400, the expiration time for the selected entry or entries is set to the current date, and the expiration status (column 460) for each such entry is automatically set to expired. When the on-demand function "Expire Now" is applied to a group, the entry for each group member in table 400 is revised accordingly. The newly-expired users and user groups are then preferably depicted using a visual indicator such as italicized font, a special icon, and/or special colors for the foreground and background text, as discussed above with reference to FIGS. 2 and 3. (The expired items may also be moved to a special folder, as discussed with reference to element 231 of FIG. 2.)

In an optional aspect, rather than automatically expiring the entry or entries when the user selects "Expire Now", the automatic expiration may be conditioned upon whether the IM user has configured his IM client such that the expiration function is enabled for users and/or groups. Refer to the discussion of elements 233 and 234 of FIG. 2, above.

In one aspect, selecting "Configure Expiration Settings" from the pop-up menu enables the IM user to configure expiration settings that apply globally to all users and groups. In this case, a display such as that shown in FIG. 2 is preferably presented, and is processed as has been described with reference to FIG. 2. In another aspect, upon selecting "Configure Expiration Settings" from the pop-up menu, the selections made will apply only to the user(s) and/or group(s) that were selected when the pop-up menu was activated. A display similar to that shown in FIG. 5 may be presented for this purpose, allowing input for each selected user and group. Or, the display may be specifically adapted for presenting multiple users and groups. The processing of entered information preferably proceeds as has been described with reference to updates made using display 500 of FIG. 5.

Selecting "Reset Expiration Settings" from the pop-up menu preferably enables the IM user to set new values for the default expiration settings (e.g., using a display such as that shown in FIG. 2), but instead of applying those new defaults to all users and groups (as has been described with reference to FIG. 2), the new values are applied selectively to only those users and groups that were selected when the pop-up menu was activated.

The pop-up menu choices "Chat", "Remove", and "Edit Nickname" preferably invoke IMS functions as in the prior art. That is, the "Chat" selection preferably triggers an IMS function for message creation, the "Remove" selection preferably enables the IM user to delete selected users and user groups, and the "Edit Nickname" function allows the IM user to change the nickname for one or more of the users or groups defined in his IM address book. The "Alert Me When" function may proceed as in the prior art, whereby the IM user identifies criteria that comprise one or more events for which this user wishes to be notified. According to an optional aspect of the present invention, this "Alert Me When" function may also be used to define an event that, when triggered, provides an additional date as input to the auto-expiration computations, as has been discussed above.

Referring again to FIG. 5, the "Revive" buttons 524, 534 may be used to selectively revive a particular user or user group (for example, after the IM user chooses "Configure Expiration Settings" from the pop-up menu). Revival may also occur in other ways, such as by receiving an inbound IM message from an expired user or group. This type of revival was discussed above, and may be made conditional on the IM user's configuration choices. (See the discussion of elements 235 and 236 of FIG. 2.) Revival may also be triggered when the IM user selects the "Reset Expiration Settings" choice from the pop-up menu, causing new expiration status to be determined for selected users and/or groups. As another approach, a keystroke sequence such as double-clicking on a user name or group name may be defined as causing newly-entered expiration defaults to be applied to a particular user or user group.

Referring now to FIGS. 6-8, flowcharts are provided depicting logic that may be used when implementing preferred embodiments of the present invention. Each of these flowcharts will now be described.

FIG. 6 illustrates logic that may be used when implementing the auto-expiration evaluation or checking function. As stated earlier, this logic is preferably invoked upon occurrence of a scheduled auto-expiration evaluation action or upon reaching a configured interval (which may be set, for example, to once-per-month). Preferably, each unexpired entry is evaluated in turn at each such invocation. This may be accomplished by iterating through the rows of table 400 and checking whether the current status for that row is set to "expired". Block 600 therefore indicates that the next unexpired entry is obtained, and a test is made at Block 610 to determine whether one was found. If this test has a negative result, then the processing of the table is complete, and control exits from FIG. 6. Otherwise, processing continues at Block 620.

Block 620 tests whether a sliding date approach is being used. As has been discussed with reference to FIG. 4, separate auto-expiration values may be specified for inbound messages and for outbound messages, or a single value may be used for both cases. The processing has been generally described above, and thus for simplification, FIG. 6 represents use of only a single value. Thus, when the test in Block 620 has a negative result, then the auto-expiration value is a fixed date, and Block 630 compares that date to the date of the last message. The term "date of last message" is used in FIG. 6 as a shorthand reference that should be construed as encompassing the "last-sent" value in column 420 and the "last-received" value in column 440. And, as stated earlier, the term "date" is meant to include date and/or time, as appropriate. Therefore, after making the comparison in Block 630, Block 650 tests whether the last message is older than the fixed date. If so, then this entry is expired, and control transfers to Block 670 where the entry is marked with the expired status (column 460). Otherwise, when the test in Block 650 has a negative result, control returns to Block 600 to obtain the next unexpired entry from the table.

Control reaches Block 640 when a sliding date approach is being used. Block 640 adds the auto-expiration interval value to the last message date, as has been described above with reference to FIG. 4, and Block 660 then checks to see if the result is earlier than the current date. If so, then this entry has expired, and it is marked accordingly in Block 670. After the processing of Block 670, or when the test in Block 660 has a negative result, control returns to Block 600, and the iteration though table 400 continues.

FIG. 7 depicts logic that may be used when implementing the expiration processing that is performed in preferred embodiments when the IM user sends an outbound message. At Block 700, the outbound message is sent, as in the prior art. Block 710 indicates that the entry in table 400 is located for each target recipient of the message (preferably, using an iterative approach whereby Blocks 710-740 are performed in turn for each user, although the iterative logic has been omitted from FIG. 7 in order to emphasize the expiration processing itself). The last-sent-message date (column 420) in the row for this user or group is then updated to the current date (and/or current time, as appropriate) at Block 720. Block 730 tests whether the expiration status (column 460) in this row is set to expired. If so, the status is changed (Block 740) to active. In either case, the processing of FIG. 7 is then complete for this row.

FIG. 8 is similar to FIG. 7, but depicts logic that may be used when implementing the expiration processing that is performed in preferred embodiments when the IM user receives an inbound message. Accordingly, Block 800 represents receiving the message (and performing prior art processing thereof, such as displaying the message to the user). Block 810 then locates the sender's entry (i.e., row) in table 400, and the last-received-message date (column 440) in that row is updated to the current date and/or time at Block 820. Block 830 tests whether the expiration status (column 460) in this row is set to expired. If not, then no further expiration processing is needed, and FIG. 8 is exited. Otherwise, processing continues at Block 840.

Blocks 840-850 pertain to rows having an expired status in column 460. In preferred embodiments, Block 840 tests whether the IM user who received this inbound message has enabled the automatic revival function described above with reference to elements 235 and 236 of FIG. 2. If so, the status in this row is changed (Block 850) to active. Otherwise, the status remains set to expired. In either case, the processing of FIG. 8 is then complete for this row.

As has been demonstrated, the present invention provides advantages over prior art IM systems, which may have significant processing overhead. The techniques disclosed herein are more efficient that prior art techniques, and are easy for the IM user to understand, configure, and use.

It should be noted that while preferred embodiments of the present invention have been described with reference to IM systems, the disclosed techniques may be leveraged by other status-aware applications or systems and/or other systems that provide functions such as presence. Furthermore, while preferred embodiments are described with reference to an IM system's "address book", this term is used as a shorthand reference to any data structure or structures with which an IM client is able to remember the users and/or user groups with which it has engaged, or will engage, in instant messaging.

The disclosed techniques may also be used advantageously in methods of doing business, for example by providing improved management of users in an IMS. As an example of how this may be provided, a service may be offered that (1) evaluates, for an IM client user, which of the users remembered by the IM client should be treated as expired; and (2) provides, for the IM client, an indication for those users which are to be treated as expired. Typically, a fee will be charged for carrying out the evaluation and providing the indication. The fee for this improved management may be collected under various revenue models, such as pay-per-use billing, monthly or other periodic billing, and so forth.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-readable storage media (including, but not limited to, disk storage, CD-ROM, optical storage, and so forth) having computer-readable program code or instructions embodied therein.

The present invention has been described with reference to flowchart illustrations and/or block diagrams usable in methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions, which may be stored on one or more computer-readable media, may be provided to a processor of a general purpose computer, special purpose computer, embedded processor, or other programmable data processing apparatus to produce a machine, such that the instructions, which execute via the processor of the computer or other programmable data processing apparatus, create computer-readable program code means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A computer-implemented method of managing user information in an instant messaging ("IM") system, comprising:

using a data structure to record IM activity on behalf of a particular user of the IM system, wherein:
the data structure comprises a plurality of entries, each of the entries corresponding to a selected one of a plurality of other IM users remembered, by the IM system, on behalf of an IM client of the particular user;
each of the entries comprises: an identifier of the selected one of the plurality of remembered IM users to which the entry corresponds; a first date indicating when the particular user last sent an instant message to the selected one; a first time period indicating a first inactivity period allowed before the particular user wants the selected one to be treated as expired, the first inactivity period corresponding to inactivity on outbound instant messages sent from the particular user to the selected one; a second date indicating when the particular user last received an instant message from the selected one; a second time period indicating a second inactivity period allowed before the particular user wants the selected one to be treated as expired, the second inactivity period corresponding to inactivity on inbound instant messages received by the particular user from the selected one; and a current expiration status of the selected one; and the first time period in at least one of the entries is different from the second time period in that one of the entries;

upon sending an instant message from the particular user to any of the plurality of remembered IM users, automatically updating the first date in the entry corresponding to that remembered IM user to a current date and setting the current expiration status in the entry to indicate that the corresponding one of the remembered users is not yet expired;

upon receiving an instant message by the particular user from any of the plurality of remembered IM users, automatically updating the second date in the entry corresponding to that remembered IM user to the current date and setting the current expiration status in the entry to indicate that the corresponding one of the remembered users is not yet expired;

periodically evaluating the entries in the data structure to determine, for the IM client of the particular user, whether any of the plurality of remembered users should be treated as expired, further comprising, for each of the entries for which the current expiration status indicates that the corresponding one of the remembered users is not yet expired:

adding the first time period from the entry to the first date from the entry, thereby computing an outbound inactivity comparison date;

adding the second time period from the entry to the second date from the entry, thereby computing an inbound inactivity comparison date;

selecting a first-occurring one of the outbound inactivity comparison date and the inbound inactivity comparison date; and setting the current expiration status in the entry to indicate that the corresponding one of the remembered users is to be treated as expired if the selected first-occurring one is prior to the current date; and for each one of the plurality of remembered users for whom the current expiration status of the corresponding entry in the data structure indicates that that one of the remembered users is to be treated as expired, omitting this user when performing IM presence management functions of the IM system but not deleting this one of the remembered users from the plurality of users remembered by the IM system on behalf of the IM client.

2. The computer-implemented method according to claim 1, wherein:

the first time period and the second time period are selected by the particular user;

the first time period is different among at least two of the entries; and the second time period is different among at least two of the entries.

3. The computer-implemented method according to claim 1, further comprising enabling the particular user to specify that one of the plurality of remembered users will be immediately treated as expired and in response, automatically setting the current expiration status in the entry corresponding to that one of the remembered users to indicate that the corresponding one is to be treated as expired.

* * * * *